(12) United States Patent
Cannon

(10) Patent No.: US 6,842,447 B1
(45) Date of Patent: Jan. 11, 2005

(54) INTERNET PROTOCOL TRANSPORT OF PSTN-TO-PSTN TELEPHONY SERVICES

(75) Inventor: Matthew J. Cannon, Dallas, TX (US)

(73) Assignee: MCI, Inc., Asburn, VA (US)

( * ) Notice: Subject to any disclaimer, the term of this patent is extended or adjusted under 35 U.S.C. 154(b) by 0 days.

(21) Appl. No.: 09/332,777

(22) Filed: Jun. 14, 1999

(51) Int. Cl.$^7$ .......................... H04L 12/66; H04L 12/28; H04M 15/06
(52) U.S. Cl. ...................... 370/352; 370/401; 370/389; 379/142.18
(58) Field of Search .................................. 370/352, 356, 370/400, 401, 354, 466, 465, 467, 385, 353, 355, 469, 389, 392; 379/229, 230, 201.01, 207.02, 220, 93.23, 265.09

(56) References Cited

U.S. PATENT DOCUMENTS

| | | |
|---|---|---|
| 5,303,286 A | 4/1994 | Wiedeman |
| 5,434,907 A | 7/1995 | Hurst et al. |
| 5,634,012 A | 5/1997 | Stefik et al. |
| 5,664,009 A | 9/1997 | Hurst et al. |
| 5,680,116 A | 10/1997 | Hashimoto et al. |
| 5,699,359 A | 12/1997 | Suga |
| 5,732,219 A | 3/1998 | Blumer et al. |
| 5,742,763 A | 4/1998 | Jones |
| 5,745,556 A | 4/1998 | Ronen |
| 5,794,039 A | 8/1998 | Guck |
| 5,802,510 A | 9/1998 | Jones |
| 5,826,039 A | 10/1998 | Jones |
| 5,832,221 A | 11/1998 | Jones |
| 5,859,898 A | 1/1999 | Checco |
| 5,864,610 A | 1/1999 | Ronen |
| 5,867,494 A | 2/1999 | Krishnaswamy et al. |
| 5,867,495 A * | 2/1999 | Elliott et al. ................. 370/352 |
| 5,883,894 A | 3/1999 | Patel et al. |
| 5,889,774 A | 3/1999 | Mirashrafi et al. |
| 5,907,547 A | 5/1999 | Foladate et al. |

(List continued on next page.)

FOREIGN PATENT DOCUMENTS

| | | |
|---|---|---|
| CN | 1207226 | 2/1999 |
| EP | 0794650 | 9/1997 |
| WO | 97/16007 | 5/1997 |
| WO | 97/16916 | 5/1997 |
| WO | WO 97/22209 | 6/1997 |
| WO | 97/22210 | 6/1997 |
| WO | 97/23078 | 6/1997 |
| WO | 98/21874 | 5/1998 |

OTHER PUBLICATIONS

Rosenberg et al., "Programming Internet Telephony Services", IEEE Network, IEEE Inc., New York, US, vol. 13, No. 1, May 1999, pp. 42–49.

(List continued on next page.)

Primary Examiner—Hanh Nguyen

(57) ABSTRACT

A system for transporting public switched network (PSTN) terminated signaling across an Internet protocol (IP) network includes a gateway between the PSTN and the IP network. The gateway receives a telephony signaling message from the PSTN and determines if the telephony signaling message maps to an IP signaling message. If the telephony signaling message does not map to an IP signaling message, the gateway packages the telephony signaling message in a special IP signaling message for transport over the IP network. If the gateway receives a special IP signaling special message, the gateway unpackages the telephony signaling message from the special message for transport over the PSTN. If the gateway receives DTMF signals from the PSTN, the gateway translates the DTMF signals to digits and packages the digits in a special IP signaling message for transport over the IP network. The gateway also packages the DTMF signals in an IP media transport protocol message for transport over the IP network.

26 Claims, 3 Drawing Sheets

U.S. PATENT DOCUMENTS

| | | | |
|---|---|---|---|
| 5,913,176 A | | 6/1999 | Barabash |
| 5,923,659 A | | 7/1999 | Curry et al. |
| 5,930,348 A | | 7/1999 | Légnier et al. |
| 5,951,638 A | | 9/1999 | Hoss et al. |
| 5,953,504 A | | 9/1999 | Sokal et al. |
| 5,956,391 A | | 9/1999 | Melen et al. |
| 5,958,005 A | | 9/1999 | Thorne et al. |
| 5,960,416 A | | 9/1999 | Block |
| 5,999,525 A | | 12/1999 | Krishnaswamy et al. |
| 6,064,653 A | * | 5/2000 | Farris .......................... 370/237 |
| 6,067,442 A | | 5/2000 | Wiedeman et al. |
| 6,069,890 A | * | 5/2000 | White et al. ................. 370/352 |
| 6,073,160 A | | 6/2000 | Grantham et al. |
| 6,078,583 A | * | 6/2000 | Takahara et al. ............ 370/356 |
| 6,081,518 A | * | 6/2000 | Bowman-Amuah ......... 370/352 |
| 6,084,952 A | | 7/2000 | Beerman, Jr. et al. |
| 6,094,525 A | | 7/2000 | Perlman et al. |
| 6,118,864 A | * | 9/2000 | Chang et al. ................ 370/352 |
| 6,134,235 A | * | 10/2000 | Goldman et al. ........... 370/352 |
| 6,137,869 A | | 10/2000 | Voit et al. |
| 6,144,667 A | * | 11/2000 | Doshi et al. ................. 370/401 |
| 6,147,975 A | | 11/2000 | Bowman-Amuah |
| 6,151,390 A | * | 11/2000 | Volftsun et al. ............ 379/229 |
| 6,151,629 A | | 11/2000 | Trewitt |
| 6,157,648 A | | 12/2000 | Voit et al. |
| 6,161,008 A | * | 12/2000 | Lee et al. .................... 370/352 |
| 6,163,536 A | * | 12/2000 | Dunn et al. .................. 370/385 |
| 6,167,042 A | * | 12/2000 | Garland et al. ............. 370/354 |
| 6,178,181 B1 | * | 1/2001 | Glitho ......................... 370/467 |
| 6,188,760 B1 | * | 2/2001 | Oran et al. .................. 379/230 |
| 6,195,697 B1 | | 2/2001 | Bowman-Amuah |
| 6,201,858 B1 | | 3/2001 | Sundhar |
| 6,202,081 B1 | | 3/2001 | Naudus |
| 6,215,858 B1 | | 4/2001 | Bartholomew et al. |
| 6,226,289 B1 | * | 5/2001 | Williams et al. ............ 370/385 |
| 6,233,318 B1 | | 5/2001 | Picard et al. |
| 6,240,391 B1 | | 5/2001 | Ball et al. |
| 6,253,249 B1 | | 6/2001 | Belzile |
| 6,278,707 B1 | * | 8/2001 | MacMillian et al. ........ 370/352 |
| 6,282,270 B1 | | 8/2001 | Porter |
| 6,292,479 B1 | * | 9/2001 | Bartholomew et al. ..... 370/352 |
| 6,301,609 B1 | | 10/2001 | Aravamudan et al. |
| 6,333,931 B1 | * | 12/2001 | LaPier et al. ............... 370/385 |
| 6,335,927 B1 | | 1/2002 | Elliott et al. |
| 6,335,968 B1 | | 1/2002 | Malik |
| 6,339,594 B1 | * | 1/2002 | Civanlar et al. ............ 370/352 |
| 6,366,576 B1 | | 4/2002 | Haga |
| 6,381,316 B2 | | 4/2002 | Joyce et al. |
| 6,411,705 B2 | * | 6/2002 | Oran et al. .................. 379/230 |
| 6,426,955 B1 | | 7/2002 | Dalton et al. |
| 6,453,034 B1 | | 9/2002 | Donovan et al. ...... 379/220.01 |
| 6,463,053 B1 | * | 10/2002 | Chen ........................... 370/352 |
| 6,507,647 B1 | | 1/2003 | Mandalia |
| 6,515,997 B1 | | 2/2003 | Feltner et al. |
| 6,519,242 B1 | | 2/2003 | Emery et al. |
| 6,529,499 B1 | * | 3/2003 | Doshi et al. ................. 370/352 |
| 6,567,399 B1 | * | 5/2003 | Schuster et al. ............ 370/352 |
| 6,570,869 B1 | | 5/2003 | Shankar et al. |
| 6,584,110 B1 | | 6/2003 | Mizuta et al. |
| 6,631,186 B1 | | 10/2003 | Adams et al. |
| 6,633,571 B1 | | 10/2003 | Sakamoto |
| 6,658,022 B1 | * | 12/2003 | West et al. .................. 370/467 |

OTHER PUBLICATIONS

Lennox et al., "Transporting User Control Information in SIP Register Payloads", Internet Engineering Task Force, Feb. 23, 1999, pp. 1–9.

Zimmerer, Eric, "SIP+ (Inter MGC Protocol); Edition 0.0", Level 3 Communications, Dec. 4, 1998, paragraph 0002, 02.1, 02.4 and Figure 4, <URL:www.cs.columbia.edu/sip/drafts/SIP+01.doc>.

Donovan, S., "The SIP Info Method", Internet Engineering Task Force, Feb. 8, 1999, the whole document.

Sijben, P. et al., "Toward the PSTN/Internet Inter-Networking; Media Device Control Protocol", Internet Engineering Task Force, Version .03, Feb. 9, 1999, paragraph 10.1 and 11.4.

Schulzrinne et al., "RTP Payload for DTMF Digits, Telephony Tones and Telephony Signals", Internet Engineering Task Force, Jun. 9, 1999, paragraph 0001, <URL: www.openphone.org/docs/dtmf/tones.pdf.>.

Schulzrinne, H. et al., "Signaling for Internet Telephony", IEEE, Oct. 13, 1998, pp. 298–307.

Schulzrinne et al. Signaling for Internet Telephony, IEEE, Sep. 1998, pp. 298–307.

H. Schulzrinne, A Comprehensive Multimedia Control Architecture for the Internet, 1997 IEEE, pp. 65–76.

Rosenberg et al. Internet Telephony Gateway Location, 1998 IEEE, pp. 488–496.

Wedlund et al. Mobility Support Using SIP, 1999 Association for Computing Machinery, pp. 76–82.

* cited by examiner

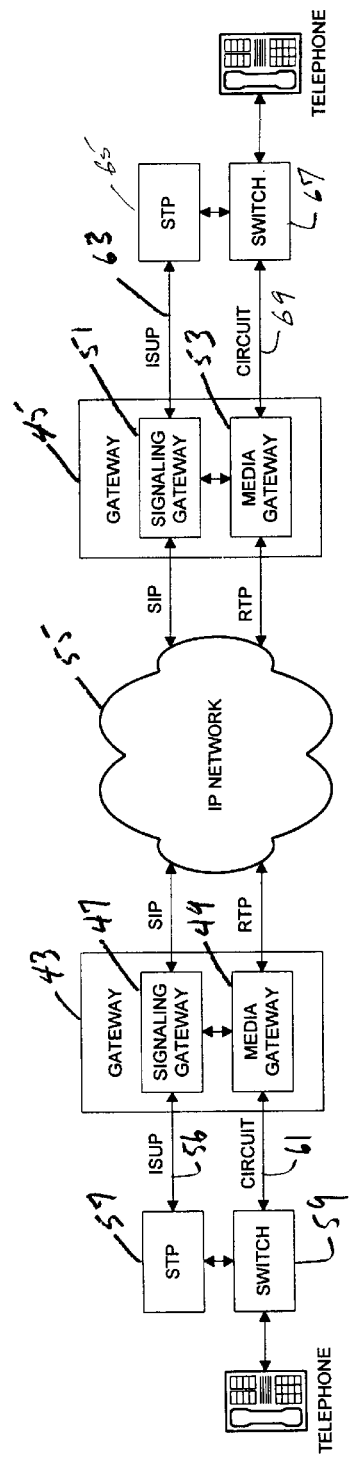
FIG. 2
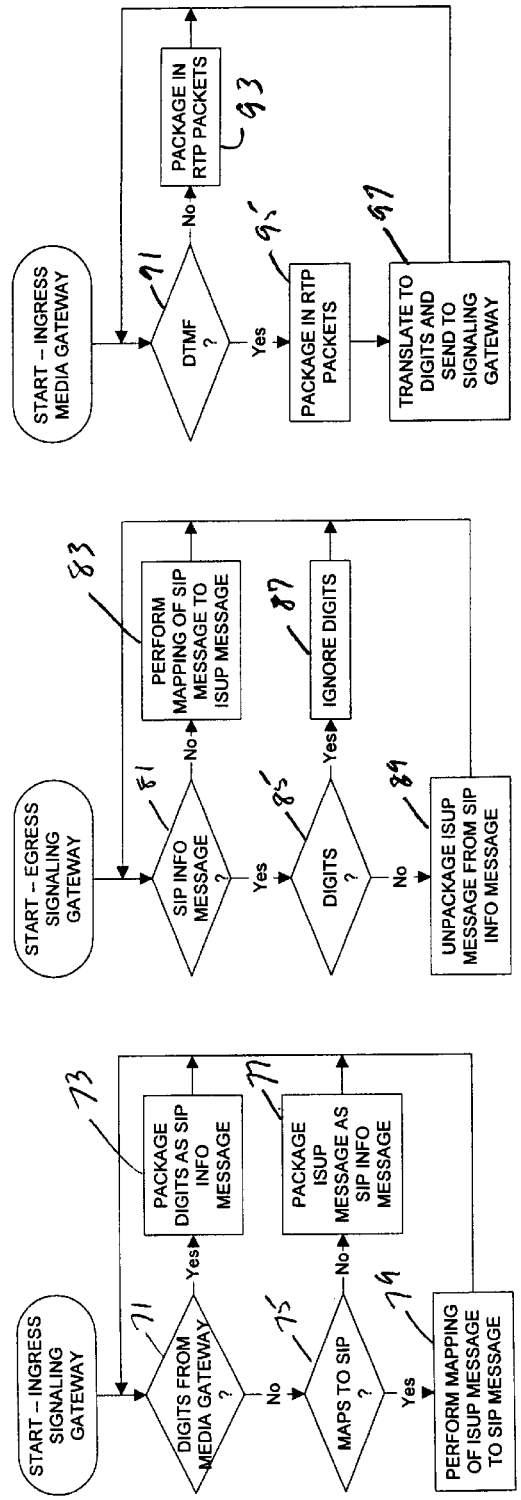
FIG. 5
FIG. 4
FIG. 3

INTERNET PROTOCOL TRANSPORT OF PSTN-TO-PSTN TELEPHONY SERVICES

BACKGROUND

The present invention relates generally to the field of telecommunications, and more particularly to a method of and system for transporting public switched network (PSTN) terminated signaling across an Internet protocol (IP) network.

DESCRIPTION OF THE PRIOR ART

Internet telephony is the real-time delivery of voice, and other multimedia data, between two or more parties across a network using Internet protocols (IP). Internet telephony began in the mid-1990s with the introduction of Internet phone software. Internet phone software is designed to run on a personal computer equipped with a sound card, speakers, microphone, and modem. Software compresses the voice signal and translates it into IP packets for transmission over the Internet. This basic PC-to-PC Internet telephony works, however, only if both parties are using Internet phone software.

Internet telephony offers the opportunity to design a global multimedia communications system that may eventually replace the existing circuit switched telephony infrastructure. In a relatively short period of time, Internet telephony has advanced rapidly. Many software developers now offer PC telephony software.

Internet telephony is session based rather then connection based. Generally, a first Internet protocol is used to establish the session and negotiate the capabilities for the session, and a second Internet protocol is used to transport the actual media across the IP network. With the proliferation of PC based Internet telephony software, there has been a need to standardize the protocols. One current method for handling call or session setup and tear down in an IP network is the session initiation protocol (SIP). The SIP protocol was designed to handle calls between devices, such as PCs, connected directly to an IP based network.

While IP telephony offers benefits to both users and carriers in terms of cost and variety of media types, there is a substantial installed base of traditional telephones served by the public switched telephone network (PSTN). Moreover, in addition to its widespread nature, the PSTN offers a rich set telephony services. Accordingly, there is a desire to integrate the PSTN with IP networks, including the Internet and private intranets. Thus, there are instances when a call originated by a phone on the PSTN will be required to be carried through an IP based network for eventual delivery to a second phone on the PSTN. In order for this to work properly, all the call related signaling information must be passed through the IP network without loss of information.

The SIP protocol is sufficient to handle most calls setup, connect, and release related signaling. However, the SIP protocol does not support a method to carry mid-call signaling information. Examples of mid-call signaling information are the ISDN defined suspend and resume operations.

In addition to ISUP mid-call signaling, a second type of telephony session control information that needs to be carried during a session is DTMF or "dial plus" generated information. There are various telephony services implemented today that require the use of DTMF digits. Due to the design of these features, the DTMF information needs to be carried both as part of the media stream, i.e. in the real-time transport protocol (RTP) flow, and as part of the signaling or control path. However, in IP telephony, there is a separation of the media and control paths. In the IP environment, intelligent services are implemented by SIP proxy servers, which are in the control path, but not the media path. Accordingly, the SIP proxy servers that provide IP network intelligence are unaware of DTMF information.

SUMMARY

The present invention provides a method of and system for transporting public switched network (PSTN) terminated signaling across an Internet protocol (IP) network. The system of the present invention includes a gateway between the PSTN and the IP network. A gateway according to the present invention receives a telephony signaling message, such as a Signaling System 7 (SS7) Integrated Services Digital Network (ISDN) User Part (ISUP) message, from the PSTN and determines if the telephony signaling message maps to an Internet protocol signaling message, such as a Session Initiation Protocol (SIP) message. If the telephony signaling message does not map to an Internet protocol signaling message, the gateway packages the telephony signaling message in an Internet protocol signaling special message for transport over the IP network. If the gateway of the present invention receives an Internet protocol signaling special message, the gateway unpackages the telephony signaling message from the Internet protocol signaling special message for transport over the public switched telephone network.

The gateway of the present invention is particularly adapted to transport PSTN mid-call signaling across an IP network. The gateway of the present invention is also adapted to transport DTMF signaling across an IP network. When the gateway receives DTMF signals from the PSTN, the gateway translates the DTMF signals to digits and packages the digits in an Internet telephony protocol signaling special message for transport over the IP network. The gateway also packages the DTMF signals in an IP media transport protocol, such as Realtime Transport Protocol (RTP), message for transport over the IP network.

BRIEF DESCRIPTION OF THE DRAWINGS

FIG. 2 is a block diagram illustrating the gateway of the present invention.

FIG. 3 flowchart of ingress signaling gateway processing according to the present invention.

FIG. 4 is flowchart of egress signaling gateway processing according to the present invention.

FIG. 5 is a flowchart of ingress media gateway processing according to the present invention.

DESCRIPTION OF THE PREFERRED EMBODIMENT

Figure 1:
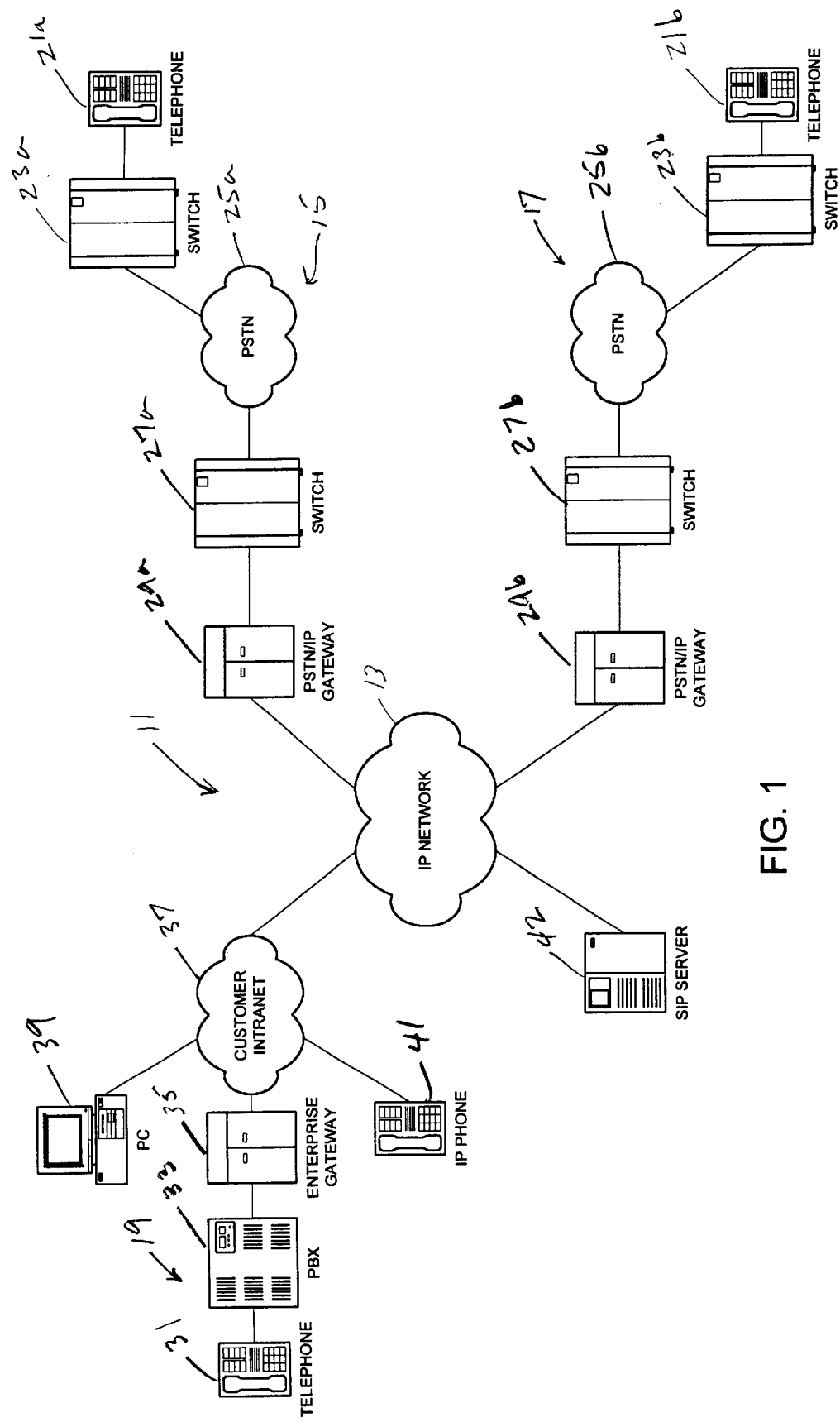
FIG. 1 is a block diagram of telecommunications system according to the present invention.

Referring now to the drawings, and first to FIG. 1, a telecommunications system is designated generally by the numeral 11. System 11 includes an IP network, indicated generally at 13, and various varieties of traditional telephone networks, including a first PSTN 15 and a second PSTN 17. The traditional telephone networks may also include a private telephone network 19. The traditional telephone networks are adapted to provide traditional telephony services and, according to present invention, interface with IP network 13.

PSTNs 15 and 17 are adapted to provide telephony services between subscribers using traditional telephones 21. Telephones 21 are operably connected to originating switches 23, which provided access to telephone networks indicated generally at 25. Calls are routed through network 25 to terminating switches 27. According to the present invention, terminating switches 27 are operably connected to PSTN/IP gateways 29. The operation and structure of PSTN/IP gateways 29 will be discussed in detail hereinafter.

Private telephone network 29 is adapted to provide telephone services to members of an organization at a particular site. Users use telephones 31 to make calls to other members of the organization or to outside parties. Telephone 31 is operably connected to a private branch exchange (PBX) 33. PBX 33 is operably connected to an enterprise gateway 35, the structure and operation of which is similar to that of PSTN/IP gateways 29. Enterprise gateway 35 is operably connected to a private intranet 37, which in turn is connected to IP network 13. Intranet 37 is also adapted to provide IP telephony services to IP enabled personal computers 39 and IP phones 41.

Subscribers using telephones 21 and 31 can make telephone calls to each other and to other telephones connected to system 11, or to Internet devices such as personal computers 39 or IP phones 41. Such calls are setup and routed using a combination of standard telephony and Internet signaling and media transport protocols. Intelligent network services may be provided in the PSTN or in the IP network by means of proxy servers 42.

The ISDN User Part (ISUP) defines the protocol and messages used for establishing and tearing down voice and data calls over the public switched telephone network. Network elements use ISUP messages and their parameters to setup and tear down voice and data circuits. The basic messages used in connection with setting up and tearing down voice circuits are the initial address message (IAM), the address complete message (ACM), the answer message (ANM), the release message (REL), and the release circuit message (RLC).

The IAM is sent by a switch in the forward direction to initiate seizure of an outgoing circuit and to transmit number and other information relating to the routing and handling of the call. The ACM message is sent in the backward direction indicating that all of the address signals required to route the call have been received at the terminating switch. The ANM is sent in the backward direction indicating that call has been answered. After the ANM has been received, the call proceeds. The REL message is sent in either direction to indicate that the circuit is being released due to the reason or cause supplied with the message. The RLC message is sent in response to the receipt of an REL message when the appropriate circuit has been brought into an idle condition.

Session initiation protocol (SIP) is a standard proposed by the Internet Engineering Task Force (EITF) for establishing, modifying, and terminating multimedia IP sessions. An IP telephone call is a special multimedia session in which voice data is exchanged between parties. SIP is a client/server protocol in which clients issue requests and servers answer with responses. Currently, SIP defines six requests or methods, including INVITE, ACK, OPTIONS, REGISTER, CANCEL, and BYE.

The INVITE request is used to ask for the presence of a called party in a multimedia session. The ACK method is sent to acknowledge a new connection. OPTIONS is used to get information about the capabilities of the server. In response to an OPTIONS request, the server returns the methods that it supports. The REGISTER method informs a server about the current location of the user. The CANCEL method terminates parallel searches. When a server is trying to reach a user, it can try several locations. When the user is reached, the rest of the searches can be canceled. The client sends a BYE method to leave a session; for a two party call, the BYE method terminates call.

When a server receives a request, it sends back a response. In SIP, each type of response is defined by a three-digit code number. There are six main types of responses, including 1XX informational, 2XX successful, 3XX redirection, 4XX request failure, 5XX server failure, and 6XX global failure. An example of an informational response is the 180 ringing response. An example of a successful response is the 200 OK response.

The interface between the standard telephony portion of system 11 and the IP portion of system 11 is provided by gateways 29 and 35. Gateways 29 and 35 provide protocol translation of both the signaling and the media. Referring to FIG. 2, there is illustrated the architecture of and services provided by gateways such as PSTN/IP gateway 29 and enterprise gateway 35. In FIG. 2, an ingress gateway is indicated at 43 and an egress gateway is indicated at 45. The labels "ingress" and "egress" are used purely for identification and not to be construted in a limiting sense. Accordingly, those skilled in the art will recognize that the gateway 43 could act as an egress gateway and the gateway 45 could act as an ingress gateway if the call is initiated at an opposite end of system 11. Ingress gateway 43 includes a signaling gateway 47 and a media gateway 49. Similarly, egress gateway 45 includes a signaling gateway 51 and media gateway 53.

Signaling gateway 47 is connected between a telephony signaling link 56 and an IP network 55. Signaling link 56 is connected to a signal transfer point (STP) 57, which in turn is connected to a switch 59. In the preferred embodiment of the present invention, signaling gateway 47 provides bidirectional protocol translation between ISUP messages and session initiation protocol(SIP) requests and responses, which are collectively referred to as messages. Media gateway 49 is connected between a voice trunk 61 and EP network 55. Voice trunk 61 is connected to switch 59. Media gateway 49 provides bidirectional protocol translation between standard time division multiplexed (TDM) voice circuits and an IP media transport protocol, such as real-time transport protocol (RTP).

Similarly, signaling gateway 51 is connected between IP network 55 and a telephony signaling link 63. Signaling link 63 is connected to an STP 65, which in turn is connected to a terminating switch 67. Egress media gateway 53 is connected between IP network 55 and a voice trunk 69. Voice trunk 69 is connected to terminating switch 67.

Figure 6:
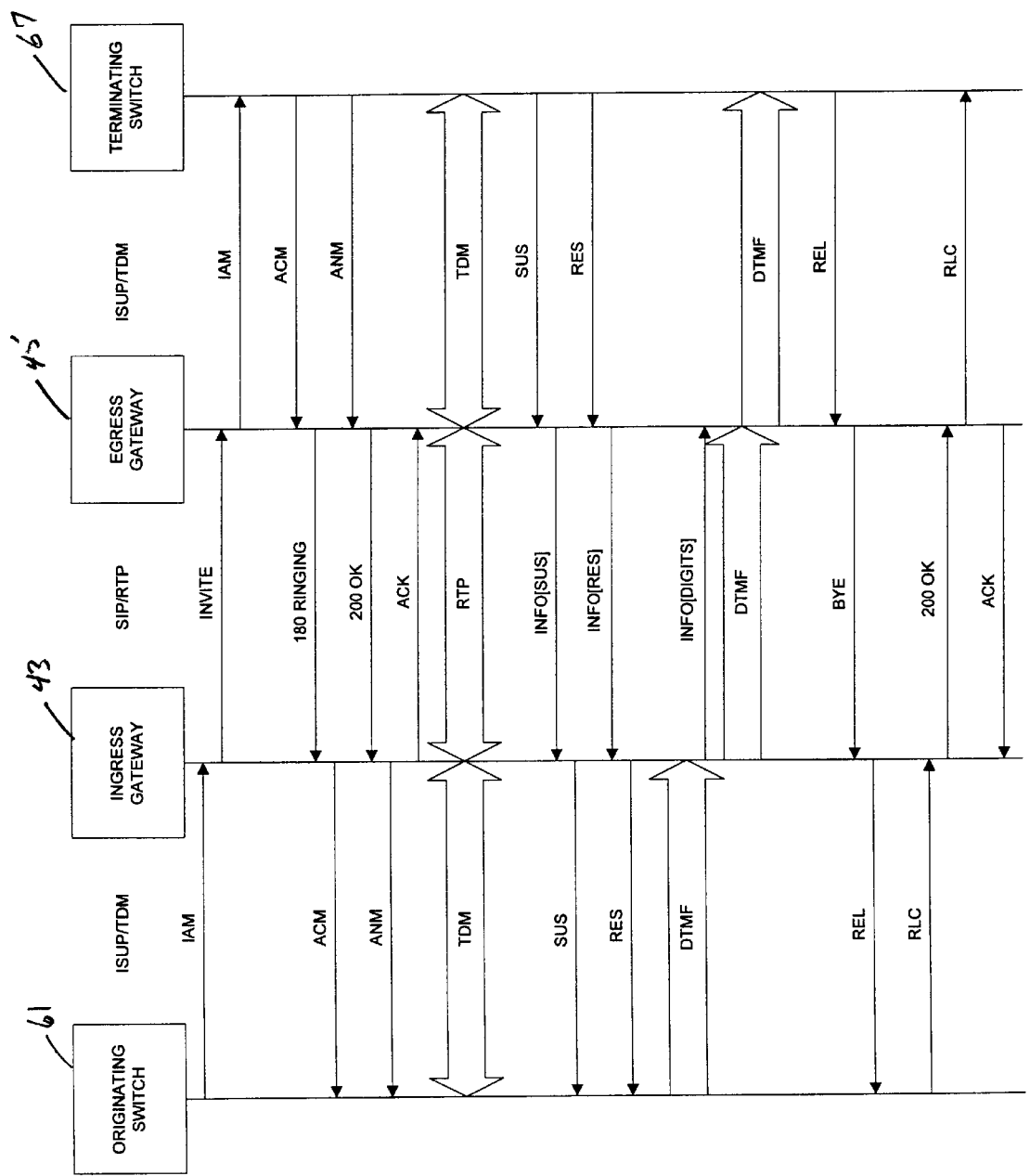
FIG. 6 is a call flow diagram illustrating the operation of the method and system of the present invention.

The mapping between PSTN media and signaling transport and IP media and signaling transport is illustrated with respect to the call flow diagram of FIG. 6. FIG. 6 illustrates the progress of call between an originating switch 59 and the terminating switch 67 of FIG. 2. Signaling between the switches and their associated STPs is omitted for the sake of clarity. The PSTN signaling is accomplished through ISUP messages. The PSTN media transport is accomplished through TDM. The IP portion of the call is carried between ingress gateway 43 and egress gateway 45. The IP signaling is accomplished through SIP and the media transport is accomplished through RTP.

A call is initiated with an IAM message sent from originating switch 61 to ingress gateway 43. Ingress gateway 43 translates the IAM message to a SIP INVITE message, which is transmitted to egress gateway 45. Egress gateway 45 translates the INVITE message to an IAM sent to terminating switch 67. In response to the IAM message, terminating switch 67 sends an ACM message back to egress gateway 45. Egress gateway 45 translates the ACM message to a SIP 180 ringing response addressed to ingress gateway 43. Ingress gateway 43 translates the 180 ringing response to an ACM message. When the called party answers the call, terminating switch 67 sends an ANM message to egress gateway 45, which.egress gateway 45 translates to a 200 OK response. When ingress gateway 43 receives the 200 OK response, it sends an ANM to originating switch 61 and the call is established.

During the call, the media gateways of ingress gateway 43 and egress gateway 45 perform bidirectional translation between TDM and RTP. During the call, there may be signaling, either by system-generated ISUP messages or by user-generated DTMF digits, that are not supported by the current implementation of SIP. Accordingly, the present invention provides a special new SIP request or method referred to as the INFO method. The INFO method uses as its argument any ISUP message or sequence of dialed digits that does not map to a defined SIP request or response. For example, if the called party is temporarily disconnected, terminating switch 67 sends an ISUP suspend (SUS) message to egress gateway 45. The SUS message does not map to any defined SIP request or response. Thus, according to the present invention, egress gateway 45 packages the SUS message in an INFO message for transport to ingress gateway 43. Ingress gateway 43 unpackages the INFO message and sends the SUS message to originating switch 61. When the called party is reconnected, terminating switch 67 sends an ISUP resume (RES) message to egress gateway 45. Again, the RES message does not map to any defined SIP request or response. Thus, according to the present invention, egress gateway 45 packages the RES message in an INFO message for transport to ingress gateway 43. Ingress gateway 43 unpackages the INFO message and sends the RES message to originating switch 61.

Also, during the call, a user may initiate signaling by entering DTMF digits. The DTMF digits may be intended for use by a terminating device, such as answering machine to retrieve messages. Alternatively, the DTMF signals may be intended for use by an intelligent network element, which may be part of the PSTN or an element of the IP networks, such as a SIP proxy server. Because of the separation of the signaling and media transport during the IP portion of the call, it is necessary to send the DTMF information in both the signaling path and the media path.

Referring still to FIG. 6, DTMF tones are transmitted in the TDM stream from originating switch 61 to ingress gateway 43. The DTMF tones are received at the media gateway 49 of ingress gateway 43. Accordingly, the media gateway 49 performs two operations simultaneously. The media gateway 49 converts the DTMF tones to digits and passes those digits to the signaling gateway 47 of ingress gateway 43. The media gateway 49 also converts the DTMF tones into RTP packets for transport to the media gateway 53 of egress gateway 45. The signaling gateway 47 of ingress gateway 43 packages the digits received from the media gateway 49 in a SIP INFO request for transport to the signaling gateway 51 of egress gateway 45. The INFO message with the packaged digits may be used by any SIP proxy servers in the IP signaling path to provide intelligent network services. The egress gateway 45 ignores the INFO request with the digits and translates the RTP packet into TDM signals.

At the completion of the call, one of the parties hangs up. In the example of FIG. 6, called party terminates the call and terminating switch 67 sends an REL message to egress gateway 45. Egress gateway 45 translates the REL message to a BYE request, which is transported to ingress gateway 43. Ingress gateway 43 translates the BYE request to an REL message to originating switch 61. In response to the REL message, originating switch 61 sends an RLC message back to ingress gateway 43. Ingress gateway 43 sends a 200 OK response to egress gateway 45. The egress gateway 45 sends a SIP ACK request back to ingress gateway 43 and an ISUP RLC message to terminating switch 67.

The processing of the gateways according to the present invention is illustrated with respect to FIGS. 3–5. Referring first FIG. 3, which illustrates ingress signaling gateway processing, when a signal is received, the ingress signaling gateway determines, at decision step 71, if the signaling is digits from the media gateway. If so, then the ingress signaling gateway packages the digits as a SIP INFO request at step 73. If not, then the ingress signaling gateway determines, at decision step 75, if the message maps to a SIP request or response. If not, then the ingress signaling gateway packages the signaling in a SIP INFO message at step 77. If, at decision step 75, signaling does map to SIP, then the ingress signaling gateway performs the appropriate mapping, at step 79.

Referring to FIG. 4, there is shown egress gateway processing. When the egress gateway receives signaling, the egress gateway determines, at decision step 81, if the signaling is a SIP INFO request. If not, then the egress signaling gateway performs appropriate mapping, at step 83. If, at decision step 81, the signaling is a SIP INFO request, then the egress signaling gateway determines, at decision step 85, if the argument of the request is digits. If so, then the egress signaling gateway ignores the digits, as indicated at step 87. If, at decision step 85, the argument of the request is not digits, then the egress signaling gateway unpackages the ISUP message from the SIP INFO request, at step 89.

Referring to FIG. 5, there is shown ingress media gateway processing. As the ingress media gateway receives TDM data, it determines, at decision step 91, if the data are DTMF tones. If not, then the ingress media gateway packages the incoming data in RTP packets, at step 93. If, at decision step 91, the incoming data are DTMF tones, then the ingress media gateway packages the tones in RTP packets, at step 95, and translates the DTMF tones to digits and sends those digits to the signaling gateway, at step 97.

From the foregoing, it may be seen that the present invention provides a method and system that supports midcall signaling for PSTN terminated calls that traverse an IP network. Those skilled in the art will recognize alternative embodiments, given the benefit of this disclosure. Accordingly, the foregoing is intended for purposes of illustration and not of limitation.

What is claimed is:

1. A method of transporting calls across an Internet protocol network, the method comprising:

receiving a telephony signaling message at an Internet telephony gateway;

determining if the telephony signaling message maps to an Internet protocol signaling message; and if the telephony signaling message does not map to the Internet protocol signaling message, packaging the telephony signaling message in an Internet protocol signaling special message for transport over the Internet protocol network, the Internet protocol signaling special message including a session initiation protocol (SIP) INFO message.

2. The method as claimed in claim 1, further comprising:

receiving the Internet protocol signaling special message at a second Internet telephony gateway; and unpackaging the telephony signaling message from the Internet protocol signaling special message for transport over a public switched telephone network.

3. The method as claimed in claim 1, wherein the telephony signaling protocol is SS7.

4. The method as claimed in claim 3, wherein the telephony signaling protocol message is an ISUP message.

5. The method of claim 1, further comprising:

receiving dual-tone frequency (DTMF) signals at the gateway;

translating the DTMF signals to digits; and packaging the digits in an Internet protocol signaling special message for transport over the Internet protocol network.

6. The method as claimed in claim 5, comprising packaging the DTMF signals in an Internet protocol media transport message for transport over the Internet protocol network.

7. A telecommunications system gateway, comprising:

a signaling gateway adapted to translate telephony signaling messages to Internet protocol signaling messages, the signaling gateway including means for packaging a telephony signaling message that does not map to an Internet protocol signaling message in an Internet protocol special signaling message, the Internet protocol special signaling message including a session initiation protocol (SIP) INFO message; and a media gateway adapted to translate telephony media to Internet protocol media.

8. The gateway as claimed in claim 7, wherein the signaling gateway includes means for unpacking a telephony signaling message from the Internet protocol special signaling message.

9. The gateway as claimed in claim 7, wherein the media gateway comprises means for packaging DTMF signals in an Internet media transport protocol message.

10. The gateway as claimed in claim 9, wherein the media gateway further comprises means for unpackaging DTMF signals from Internet protocol media transport messages.

11. The gateway claimed as in claim 9, wherein the gateway further comprises:

means for translating dual-tone multi-frequency (DTMF) signals to digits; and means for providing the digits to the signaling gateway.

12. The gateway as claimed in claim 11, wherein the signaling gateway comprises means for packaging the digits in the special Internet protocol signaling message.

13. A telecommunications system comprising:

an Internet telephony gateway operably connected between a first public switched telephone network and an Internet protocol network, the telephony gateway including:

means for mapping telephony signaling messages to Internet protocol signal messages; and means for packaging a telephony signaling message that does not map to an Internet protocol signaling message in a special Internet protocol signaling message for transport over the Internet protocol network, the special Internet protocol signaling message including a session initiation protocol (SIP) INFO message; and a second Internet telephony gateway operably connected between the Internet protocol network and a second public switched telephone network, the second telephony gateway including:

means for mapping Internet protocol signaling messages to telephony signal messages; and means for unpacking the special Internet protocol signaling messages for transport over the second public switched telephone network.

14. The system as claimed in claim 13, wherein the telephony signaling protocol is SS7.

15. The system as claimed in claim 14, wherein the telephony signaling protocol messages are ISUP messages.

16. The system as claimed in claim 13, wherein the telephony gateway comprises:

means for translating dual-tone multi-frequency (DTMF) signals to digits; and means for packaging the digits in the Internet protocol signaling special message for transport over the Internet protocol network.

17. The system as claimed in claim 16, wherein the telephony gateway further comprises means for packaging DTMF signals in an Internet protocol media transport message for transport over the Internet protocol network.

18. A method for transporting calls across an Internet protocol network comprising:

establishing an Internet telephony session;

receiving a first telephony signaling message, at an Internet gateway, during the session;

determining if the first telephony signaling message maps to an Internet protocol signaling message;

translating the first telephony signaling message to an Internet protocol signaling message for transport over the Internet protocol network based on the first telephony signaling message mapping to the Internet protocol signaling message;

receiving a second telephony signaling message, at an Internet gateway, during the session;

determining if the second telephony signaling message maps to the Internet protocol signaling message; and packaging the second telephony signaling message in an Internet protocol signaling special message for transport over the Internet protocol network based on the second telephony signaling message not mapping to the Internet protocol signaling message, the Internet protocol signaling special message including a session initiation protocol (SIP) INFO message.

19. The method recited in claim 18 further comprising:

receiving a dual-tone multi-frequency (DTMF) signal, at the Internet gateway, during the session;

translating the DTMF signal to a digit; and packaging the digit in the Internet telephony protocol signaling special message and translating the DTMF signal to an Internet protocol media transport message for transport over the Internet protocol network.

20. The method recited in claim 18 further comprises:

receiving a second Internet protocol signaling special message, at the Internet gateway, during the session;

unpacking a digit from the Internet protocol signaling special message; and translating the digit to a dual-tone multi-frequency (DTMF) signal.

21. A method for transporting calls across the Internet comprising:

establishing an Internet telephony session;

receiving an Internet protocol signaling message, at an Internet gateway, during the session;

translating the Internet protocol signaling message to a first telephony signaling message for transport over a public switched telephone network;

receiving an Internet protocol signaling special message, at the Internet gateway, during the session, the Internet protocol signaling special message including a session initiation protocol (SIP) INFO message; and unpacking a telephony signaling message from the Internet protocol signaling special message for transport over a public switched telephone network.

22. A telecommunications device comprising:

an Internet telephony signaling gateway adapted to translate a telephony signaling message to an Internet protocol signaling message and wherein the Internet telephony signaling gateway is further adapted to package a telephony signaling message that does not map to an Internet protocol signaling message to Internet protocol signaling special message, wherein the Internet protocol signaling special message includes a session initiation protocol (SIP) INFO message.

23. The system recited in claim 22, wherein the Internet telephony signaling gateway is a bidirectional Internet telephony signaling gateway adapted to translate an Internet protocol signaling message to a telephony signaling message and further wherein the Internet telephony signaling gateway adapted to unpackage a telephony signaling message from an Internet protocol signaling special message.

24. The system recited in claim 22, wherein the telephony signaling is formatted in signaling system 7 (SS7) protocol and the telephony signaling message is an integrated services user part (ISUP) message.

25. The method recited in claim 22, wherein the Internet telephony gateway is further adapted to translate a dual-tone multi-frequency (DTMF) signal to a digit and package the digit in the Internet protocol signaling special message, the device further comprising:

an Internet telephony media gateway adapted to translate the DTMF signal to an Internet protocol media transport message.

26. The method recited in claim 25, wherein the Internet telephony signaling gateway is further adapted to package the digit in the Internet protocol signaling special message.

* * * * *